(12) United States Patent
Peng et al.

(10) Patent No.: US 12,457,673 B2
(45) Date of Patent: Oct. 28, 2025

(54) MESH NETWORK-BASED SYNCHRONIZATION SYSTEM OF STAGE LIGHT GROUP

(71) Applicant: Guangzhou Haoyang Electronic Co., Ltd., Guangzhou (CN)

(72) Inventors: Yingru Peng, Guangzhou (CN); Weikai Jiang, Guangzhou (CN); Zhiming Li, Guangzhou (CN); Zhiguang Liang, Guangzhou (CN)

(73) Assignee: GUANGZHOU HAOYANG ELECTRONIC CO., LTD., Guangzhou (CN)

(*) Notice: Subject to any disclaimer, the term of this patent is extended or adjusted under 35 U.S.C. 154(b) by 251 days.

(21) Appl. No.: 18/240,767

(22) Filed: Aug. 31, 2023

(65) Prior Publication Data

US 2025/0008626 A1    Jan. 2, 2025

(30) Foreign Application Priority Data

Jun. 30, 2023    (CN) .......................... 202310795045.1

(51) Int. Cl.
*H05B 47/155*    (2020.01)
*H05B 47/16*    (2020.01)
*H05B 47/19*    (2020.01)

(52) U.S. Cl.
CPC .......... *H05B 47/155* (2020.01); *H05B 47/16* (2020.01); *H05B 47/19* (2020.01)

(58) Field of Classification Search
CPC ... H03L 1/00; H03L 1/02; H03L 7/081; H03L 7/0812; H03L 7/085; H03L 709/223; H03L 709/224; H03L 709/227; H03L 709/201; H03L 709/203; H03L 709/217; H03L 709/225; H03L 709/213; H03L 709/22; H03L 709/221; H03L 709/222; H03L 709/226; H03L 709/229; H03L 709/231; H03L 709/25; H03L 709/251; H05B 39/088; H05B 47/19; H05B 47/155; H05B 47/10; H05B 45/325; H05B 45/10;
(Continued)

(56) References Cited

U.S. PATENT DOCUMENTS 12,156,316 B2* 11/2024 Chan ....................... H04W 4/38

FOREIGN PATENT DOCUMENTS

JP    2022521018 A *    4/2022    ........... G01S 5/0278

* cited by examiner

*Primary Examiner* — Monica C King
(74) *Attorney, Agent, or Firm* — Muncy, Geissler, Olds & Lowe, P.C.

(57) ABSTRACT

A Mesh network-based synchronization system includes a plurality of stage lights and a controller for controlling the stage lights, each of the stage lights having an ad hoc network module. A LAN is established based on the Mesh technology among several stage lights by the controller under the help of the ad hoc network module, one stage light in the LAN acts as a master node, the remaining stage lights forms at least one tree-shaped network topological structure connected to the master node, and some stage lights are selected to form a group. Subsequent to time synchronization of the stage lights in the group, delay time of each stage light relative to the master node is respectively calculated according to the layer level, the master node sends a start command in advance of the corresponding delay time to the respective stage light to synchronously display a show.

13 Claims, 4 Drawing Sheets

(58) Field of Classification Search
CPC ...... H05B 45/20; H05B 47/105; H05B 47/18; H05B 47/165; H05B 47/184; H05B 45/14; H05B 45/375; H05B 45/59; H05B 47/115; H05B 47/20; H05B 47/125; H05B 47/175; H05B 47/195; H05B 45/18; H05B 45/28; H05B 45/30; H05B 45/345; H05B 45/36; H05B 45/3725; H05B 45/48; H05B 47/13; H05B 47/16; H05B 47/1985; H05B 47/1995; H05B 47/235; H05B 47/29; H05B 47/17; H05B 47/196; H04L 9/50; H04W 84/12; H04W 4/80; H04W 52/0254; H04W 4/02; H04W 84/20; H04W 12/08; H04W 12/108; H04W 24/02; H04W 4/027; H04W 4/06; H04W 4/20; H04W 4/38; H04W 4/50; H04W 4/70; H04W 40/20; H04W 52/0241; H04W 52/0245; H04W 52/245; H04W 52/247; H04W 52/283; H04W 52/367; H04W 52/383; H04W 52/52; H04W 76/14; H04W 88/04; F21V 21/30; F21V 21/15; F21V 14/08; F21V 15/01; F21V 17/02; F21V 14/02; F21V 29/503; F21V 29/83; F21V 5/008; F21V 29/76; F21V 29/67; F21V 31/005; F21V 14/06; F21V 9/40; F21V 14/00; F21V 5/04; F21V 14/04; F21V 25/00; F21V 29/60; F21V 29/673; F21V 29/717; F21V 29/763; F21V 11/08; F21V 5/007; F21V 11/186; F21V 15/00; F21V 21/14; F21V 21/26; F21V 21/28; F21V 29/677; F21V 31/00; F21V 11/18; F21V 17/12; F21V 19/00; F21V 23/003; F21V 11/16; F21V 11/183; F21V 13/04; F21V 17/002; F21V 17/06; F21V 21/06; F21V 21/29; F21V 23/0442; F21V 23/0457; F21V 23/0464; F21V 3/00; F21V 5/00; F21V 11/10; F21V 14/006; F21V 21/40; F21V 29/504; F21V 29/65; F21V 29/70; F21V 9/08; F21V 1/00; F21V 1/10; F21V 11/00; F21V 11/02; F21V 11/12; F21V 11/14; F21V 13/02; F21V 13/06; F21V 13/12; F21V 14/025; F21V 14/085; F21V 15/015; F21V 15/04; F21V 17/10; F21V 17/104; F21V 17/105; F21V 17/164; F21V 17/18; F21V 19/02; F21V 21/108; F21V 21/116; F21V 21/22; F21V 2200/00; F21V 23/00; F21V 23/009; F21V 23/04; F21V 23/0471; F21V 23/0485; F21V 23/0492; F21V 23/06; F21V 29/00; F21V 29/502; F21V 29/507; F21V 29/51; F21V 29/59; F21V 29/61; F21V 29/71; F21V 29/713; F21V 29/74; F21V 29/777; F21V 29/89; F21V 5/004; F21V 5/02; F21V 5/048; F21V 7/0091; F21V 7/04; F21V 7/041; F21V 7/06; F21V 9/00; F21V 9/32; F21V 23/008; F21V 29/90; F21V 31/03; F21V 7/05; F21W 2131/406; F21W 2131/105; F21W 2131/10; F21W 2121/008; F21W 2131/40; F21W 2131/00; F21W 2102/00; F21S 10/007; F21S 10/00; F21S 8/00; F21S 10/026; F21S 10/02; F21S 10/06; F21S 19/00; F21S 2/005; F21S 8/03; F21S 8/04; F21S 9/03; F21S 9/037; F21S 10/063; F21Y 2115/10

See application file for complete search history.

| Progress of show | Starting time | Duration | Show fame |
|---|---|---|---|
| 1 | 5000ms | 2000ms | red |
| 2 | 7000ms | 2000ms | light off |
| 3 | 9000ms | 2000ms | green |
| 4 | 11000ms | 2000ms | blue |
| — | — | — | — |

MESH NETWORK-BASED SYNCHRONIZATION SYSTEM OF STAGE LIGHT GROUP

CROSS REFERENCE TO RELATED APPLICATIONS

The present application claims priorities from Chinese Application No. CN 202310795045.1 filed on Jun. 30, 2023, all of which are hereby incorporated herein by reference.

TECHNICAL FIELD

The present invention relates to the technical field of stage lights, and more particularly, relates to a Mesh network-based synchronization system of a stage light group.

BACKGROUND

Traditional stage lights are generally controlled by means of a DMX unidirectional communication protocol. However, in such way, a console is unable to know the status of each light, causing that when there is a delay in receipt of signals from the console among different stage lights or great cumulative error of their own timing crystal oscillator, the stage lights will be out of synchronization for performance of a show. Still worse, due to lack of a feedback mechanism, the console cannot automatically adjust to achieve synchronization of the show for all the stage lights. In a way, 5G communication is used to control the stage lights with each stage light having a 5G card. While such way may still present high communication delay, and it will be difficult to control synchronization among multiple stage lights to perform the same show.

SUMMARY

With regard to the above-mentioned deficiencies, the present invention provides a Mesh network-based synchronization system of a stage light group, which can realize synchronization in a stage light group for performance of a show.

According to the present invention, the Mesh network-based synchronization system includes a plurality of stage lights and a controller for controlling the stage lights, each of the stage lights having an ad hoc network module. In the present invention, a local area network (LAN) is established based on the Mesh technology among several stage lights by the controller under the help of the ad hoc network module, in which one stage light in the LAN acts as a master node, the remaining stage lights forms at least one tree-shaped network topological structure connected to the master node, and some stage lights in the LAN are selected to form a stage light group. It is configured that subsequent to time synchronization of the stage lights in the group, delay time of each stage light in the group relative to the master node is respectively calculated according to the layer level between the corresponding stage light in the group and the master node, and the master node is configured to send a start command in advance of the corresponding delay time to the respective stage light to synchronously display a show by the stage lights within the group.

In the Mesh network-based synchronization system of a stage light group of the present invention, at least one tree-shaped network topological structure connected to the master node is formed by the remaining stage lights except the master node in the LAN. In such configuration, in order to control the stage lights in the tree-shaped network topological structure to start to display a show, the delay time of each stage light relative to the master node can be calculated respectively according to the layer level between each stage light and the master node, and start command is accordingly sent to the respective stage light in advance of corresponding delay time, thus enabling the group including the stage lights selected from the LAN to synchronously display a show. Synchronous displaying a show by the stage lights in the group has advantageous to bring much better show effect and experience for audiences.

Particularly, during the show performance by the stage lights in the group, the master node is configured to delay sending the start command according to the maximum delay time among the stage lights in the group, and then based on such delay time, to send the start command to the respective stage light in advance of the corresponding delay time of each stage light. In such way, during show performance, it is also possible to always make all the stage lights in the group display a certain show frame at the same time, thus resulting in better synchronization effect.

As it is convenient to retrieve a corresponding show frame later according to the time points when the show is segmented according to time points, that is once the time synchronization in the group is completed, the show synchronization in the group can be achieved, in the present invention, once the stage lights in the group receive data of the show, the show is segmented according to time points to acquire a show frame of respective stage light at each time point of the show.

In the case of power failure, the stage light in the group is configured to have time synchronization and receive the data of the show again once restarted, meanwhile the show of the stage light is segmented again and the stage light is adjusted to jump to the corresponding show frame according to the synchronized time. In such way, even if a certain stage light in the group is powered off, once restarted, such stage light can still be automatically kept consistent with other stage lights in the group to synchronously perform the show without any human intervention.

In the situation that stage lights in a certain layer level in the group are powered off, the stage lights in the next layer level thereof may be connected to the other stage lights in the group. In this way, even if certain stage lights having next layer levels are powered off, the stage light in the next layer level will still not be out of control and can continue to keep consistent with other stage lights within the group to perform the show.

Preferably, during time synchronization among the stage lights within the group, reference time received by the master node from the controller is sent step by step according to the layer level until all the stage lights within the group have received the reference time. In such way, initial time synchronization of the stage lights within the group can be completed fast and orderly.

In the present invention, time synchronization among the stage lights within the group is conducted in a way that: after all the stage lights within the group have received the reference time, the time of the stage light in each layer level is calibrated sequentially from the top to the bottom based on the layer level. Specifically, the time of the stage light in the next layer level is compared with the time of the stage light in the previous layer level thereof, if the time difference is less than or equal to a first preset time difference, the time thereof remains unchanged, otherwise the time of the stage light in the next layer level is synchronized on the basis of the time of the stage light in the previous layer level thereof;

after an interval of a second preset time difference, the time of the stage light in the next layer level is compared with the time of the stage light in the previous layer level thereof again, if the time difference is less than or equal to a third preset time difference, the time of the stage light in the next layer level is compared with the time of the master node, if such time difference is less than or equal to a fourth preset time difference, the time thereof remains unchanged, otherwise the time of the stage light in the next layer level is re-synchronized. In the present invention, time synchronization is calibrated layer by layer, so that the packet loss and air delay error caused by broadcasting time synchronization of the master node can be avoided. In addition, during time synchronization of the stage light in the next layer level, the stage light in the next layer level, the stage light in the previous layer level and the master node can achieve three-party time synchronization correction, it thus can ensure time synchronization performance of all the stage lights within the group to fall in the demanded error range, thus realizing accurate time synchronization.

Particularly, after the stage lights within the group complete time synchronization, the master node still continuously broadcasts a time signal in real time, and each stage light within the group compensates for the received time signal according to the delay time caused by layer level between each stage light and the master node and compares the time therebetween, if the time difference is greater than a fifth preset time difference, then the result is fed back to the master node, otherwise continues next comparison. Monitoring in real time whether the time of the stage light itself is abnormal and feeding back the result can allow a user to decide whether to timely perform adjustment for time synchronization or to allow the stage light to continue to display the show under consideration of the actual situation.

As interference to the stage lights within the group caused by the signal sent from the controller can be avoided, the show data to be displayed by the stage lights within the group is preferably forwarded by the controller through the master node, according to the present invention.

Particularly, the show data of one show to be displayed by the stage lights within the group is sent by the controller at one time. That is, the data of one show is sent at one time, and when there are multiple shows, the data of the multiple shows is sent several times. Therefore, each stage light can know in advance the corresponding show to be displayed by itself, and after the show of the stage light itself is completed to display, in a case of the time thereof becoming abnormal, the time of such the stage light can be free of synchronization, even if other stage lights are still displaying the show, thereby saving the computing power and simplifying the processing flow.

In the present invention, the stage lights in the LAN may form a plurality of groups which are independent of each other. In such configuration, each group can display its own show independently, such LAN thus can achieve more lighting effects.

In the present invention, the ad hoc network module may be a WIFI module or a Bluetooth module, which is a common ad hoc network module having stable performance, mature technology, and reduced connecting cables between the stage lights. Therefore, the stage light with such configuration can be mounted more conveniently.

Accordingly, the controller may be a cell phone, a tablet personal computer, or a mobile computer wirelessly connected to the stage lights. It is thus convenient to directly control the stage light and reduces the connecting cables with the stage light, thereby achieving more convenient to mount the stage lights.

DETAILED DESCRIPTION

Figure 1:
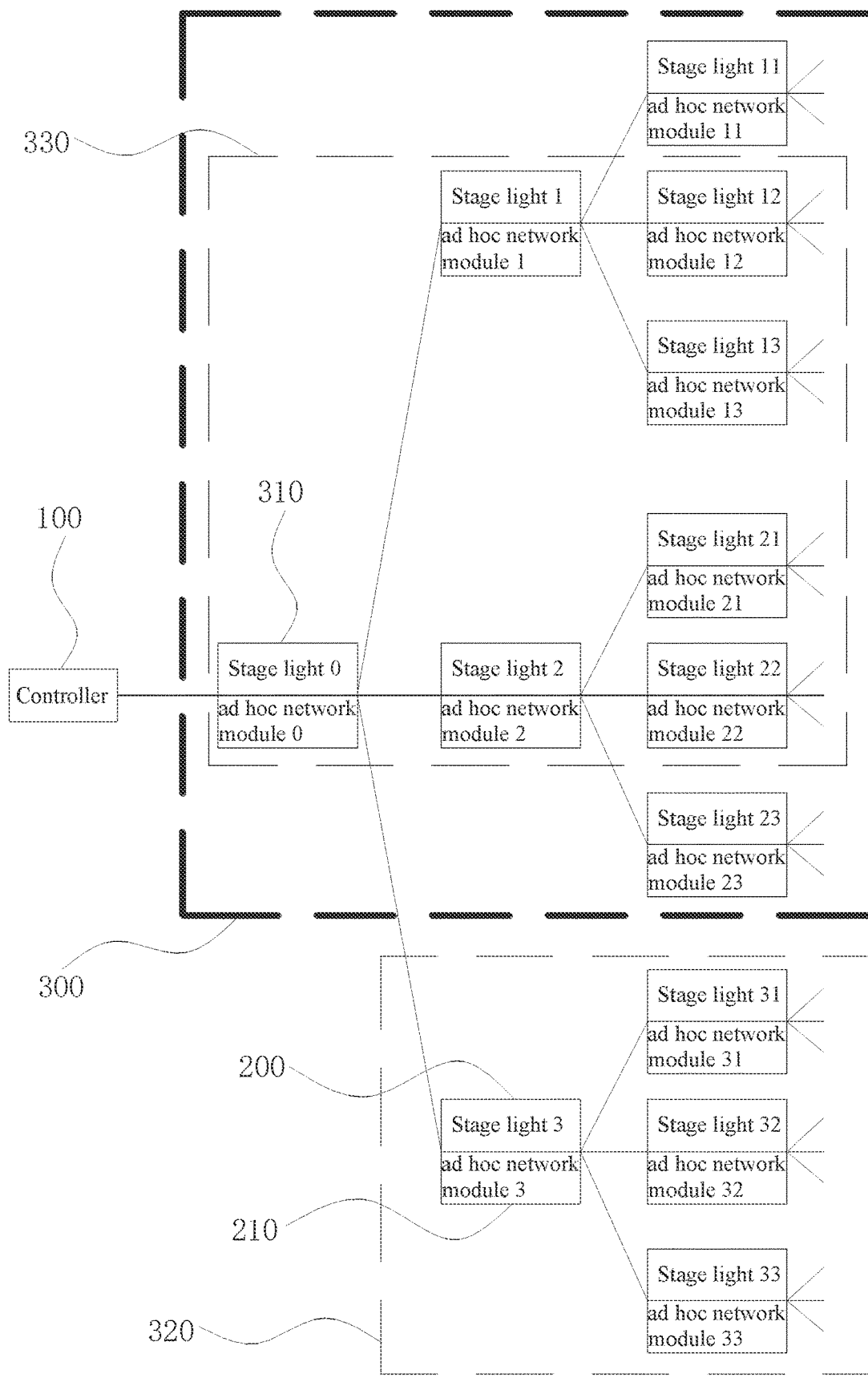
FIG. 1 is a schematic structural view of a Mesh network-based synchronization system of a stage light group according to an embodiment of the present invention.

The accompanying drawings are for exemplary illustration only, and should not be construed as limitations on this invention. In order to better illustrate this embodiment, some parts in the accompanying drawings may be omitted, enlarged or reduced, and they do not represent the size of the actual product. For those skilled in the art, it is understandable that certain well-known structures and descriptions thereof in the drawings may be omitted. The positional relationship described in the drawings is only for exemplary illustration, and should not be construed as limitations on this invention.

Figure 2:
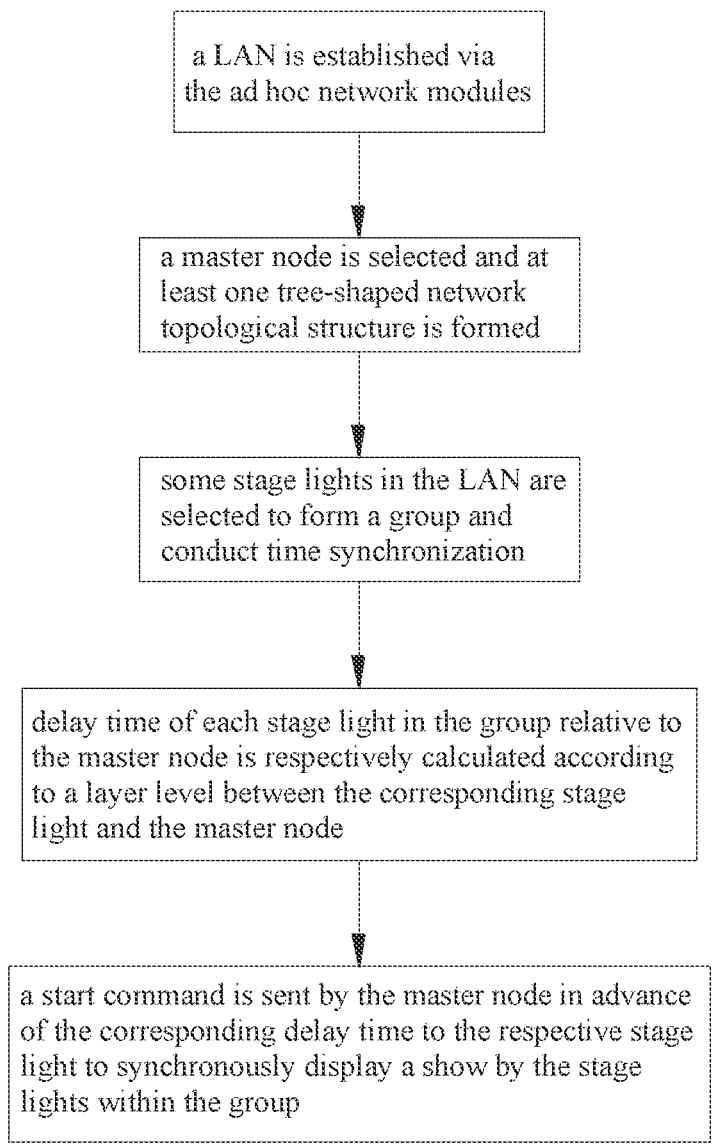
FIG. 2 is a work flowchart of the Mesh network-based synchronization system of a stage light group according to an embodiment of the present invention.

With reference to FIG. 1 and FIG. 2, a Mesh network-based synchronization system of a stage light group is provided according to an embodiment, which includes a plurality of stage lights 200 and a controller 100 for controlling the stage light 200. In the present embodiment, each of the stage lights 200 has an ad hoc network module 210, the controller 100 is particularly configured to control several stage lights 200 to establish a local area network (LAN) 300 based on the Mesh technology by the respective ad hoc network module 210. In the LAN 300, one stage light 200 is taken as a master node 310, the remaining stage lights 200 is configured to form at least one tree-shaped network topological structure 320 connected to the master node 310, and several stage lights 200 in the LAN 300 are selected to define a group 330. It is configured that subsequent to time synchronization of the stage lights 200 in the group 330, delay time of each stage light in the group 300 relative to the master node 310 is respectively calculated according to the layer level between the corresponding stage light in the group 300 and the master node 310, the master node 310 is served to send a start command in advance of the corresponding delay time to the respective stage lights 200 to synchronously display a show by the stage lights 200 within the group 330.

Network layers of one tree-shaped network topological structure 320 is usually up to more than 10, taking the master node 310 into calculation, and the number of nodes (the number of stage lights) may reach more than 200. In such a complex network state, it may frequently present massive time delay and excessive packet loss during the broadcasting in the entire network.

According to the present embodiment, at least one tree-shaped network topological structure 320 connected to the master node 310 is formed by the remaining stage lights 200 in addition to the master node 310 in the LAN 300. In such configuration, in order to control the stage lights 200 in the tree-shaped network topological structure 320 to start to display a show, the delay time of each stage light relative to the master node 310 can be calculated respectively according to the layer level between each stage light 200 and the master node 310, and start command is sent to the respective stage light 200 in advance of corresponding delay time, thus enabling the group 330 including the stage lights 200 selected from the LAN 300 to synchronously display a show. Synchronous displaying a show by the stage lights in the group brings much better show effect and experience for audiences.

It should be noted that the synchronization of the show for the stage lights 200 in the group 330 described in the present embodiment means that each stage light 200 display the show in accordance with uniform time, rather than the show frames of the individual stage lights 200 is the same at the same time. This is because the show frames of the individual stage lights 200 may or may not be the same at the same time in one show, but they need to be shown sequentially in a specific order to demonstrate intended effect, and cannot to be shown with some in advance and some delayed, which may deviate from the intended effect.

In the time synchronization of the stage lights 200 in the group 330, it is preferable to directly conduct time synchronization for all stage lights 200 throughout the LAN 300.

In a preferred embodiment of the present invention, in the show performance by the stage lights 200 in the group 330, the master node 310 is configured to delay sending start command according to the maximum delay time among the stage lights 200 in the group 330, and then based on the maximum delay time, to send the start command to the respective stage lights 200 in advance of the corresponding delay time of each stage light. In such way, the master node 310 can send the signal received in order from the largest to the smallest based on the length of the delay time to guarantee that all the stage lights 200 receive the start command at the same time. Therefore, during show performance, it is also possible to always make all the stage lights 200 in the group 330 display a certain show frame at the same time, thus resulting in better synchronization effect. It should be noted that the start command can refer to the beginning of the entire show or the beginning of a certain segment of the show.

Figures 4, 5:
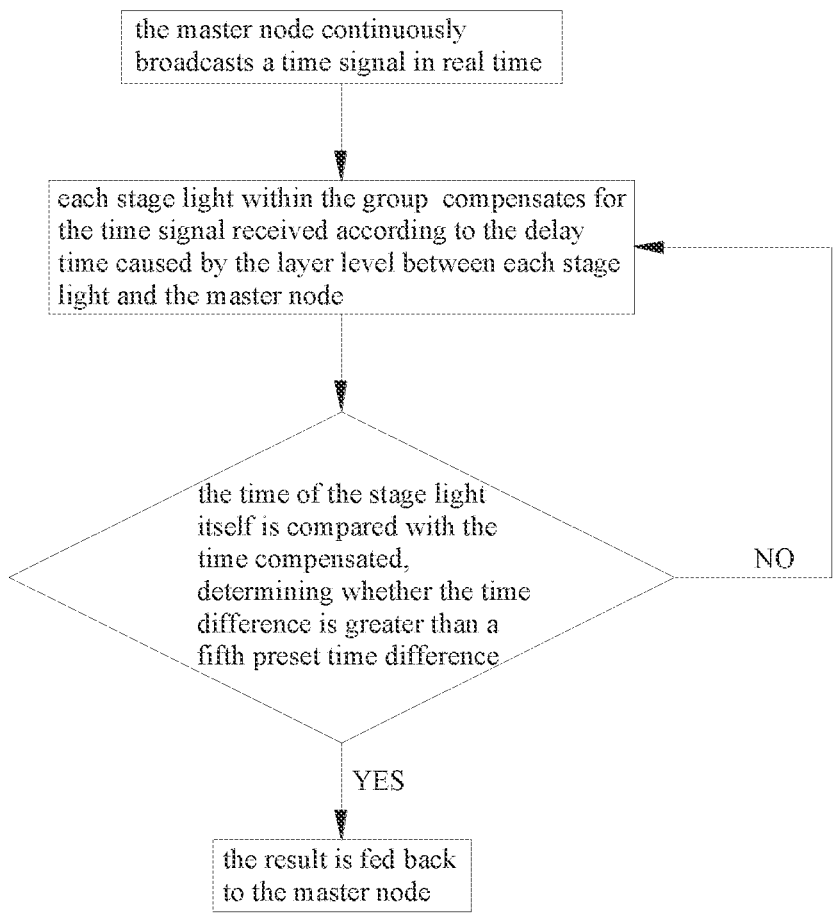
FIG. 4 is a flowchart showing how to adjust the time in real time of stage lights in a group according to an embodiment of the present invention.
FIG. 5 is a schematic view showing segmenting of a show according to an embodiment of the present invention.

As in FIG. 5, in a preferred embodiment of the present invention, after the stage lights 200 in the group 330 receive data of the show, the show is segmented according to time points to acquire a show frame of each stage light 200 at each time point of the show. With the show segmented according to time points, it is convenient to retrieve a corresponding show frame later according to the time point, i.e., the time synchronization in the group 330 is completed to realize the show synchronization in the group 330.

The show is preferably segmented according to an equal time interval.

It should be noted that the time point of the show may be a customized time within the LAN 300, or may be Beijing time or an official time anywhere in the world.

In a preferred embodiment of the present invention, in as case of power failure, after restarted, the stage light 200 in the group 330 will be re-synchronized in time and re-receive the data of the show, meanwhile the show is segmented again for the stage light 200 and the stage light are configured to be adjusted to a corresponding show frame according to the synchronized time. In this way, even if a certain stage light 200 is powered off, once restarted, the stage light can still be automatically kept consistent with other stage lights 200 in the group 330 to perform the show without any human intervention.

In the present embodiment, after the certain stage light 200 in the group 330 is powered off, the stage light 200 in the previous layer level is configured to receive change of information, and after the stage light 200 powered off is restarted, such stage light 200 will begin to resend the data of the show and time.

Generally, the data of the show includes the start time of the show, so that once the time of the stage lights 200 is synchronized, the current progress of the show can be deduced according to the synchronized time, and if the show is segmented according to the time point, it is possible to directly jump to the corresponding show frame.

In a preferred embodiment of the present invention, in a case that the stage light 200 in a certain layer level in the group 330 is powered off, the stage light 200 in the next level may be connected to the other stage lights 200 in the group 330. In this way, even if a certain stage light 200 connected to stage lights in the next layer level is powered off, the stage lights 200 in the next layer level will still not be out of control and can continue to keep consistent with other stage lights 200 within the group 330 to perform the show.

Notably, if all the stage lights 200 throughout the LAN 300 is conducted time synchronization, the stage lights 200 in the next layer level can be connected to any stage light 200 within the LAN 300.

In a preferred embodiment of the present invention, during time synchronization between the stage lights 200 within the group 330, reference time received by the master node 310 from the controller 100 is sent according to the layer level step by step until all the stage lights 200 within the group 330 receive the reference time. In such way, initial time synchronization of the stage lights 200 within the group 330 can be completed fast and orderly.

Figure 3:
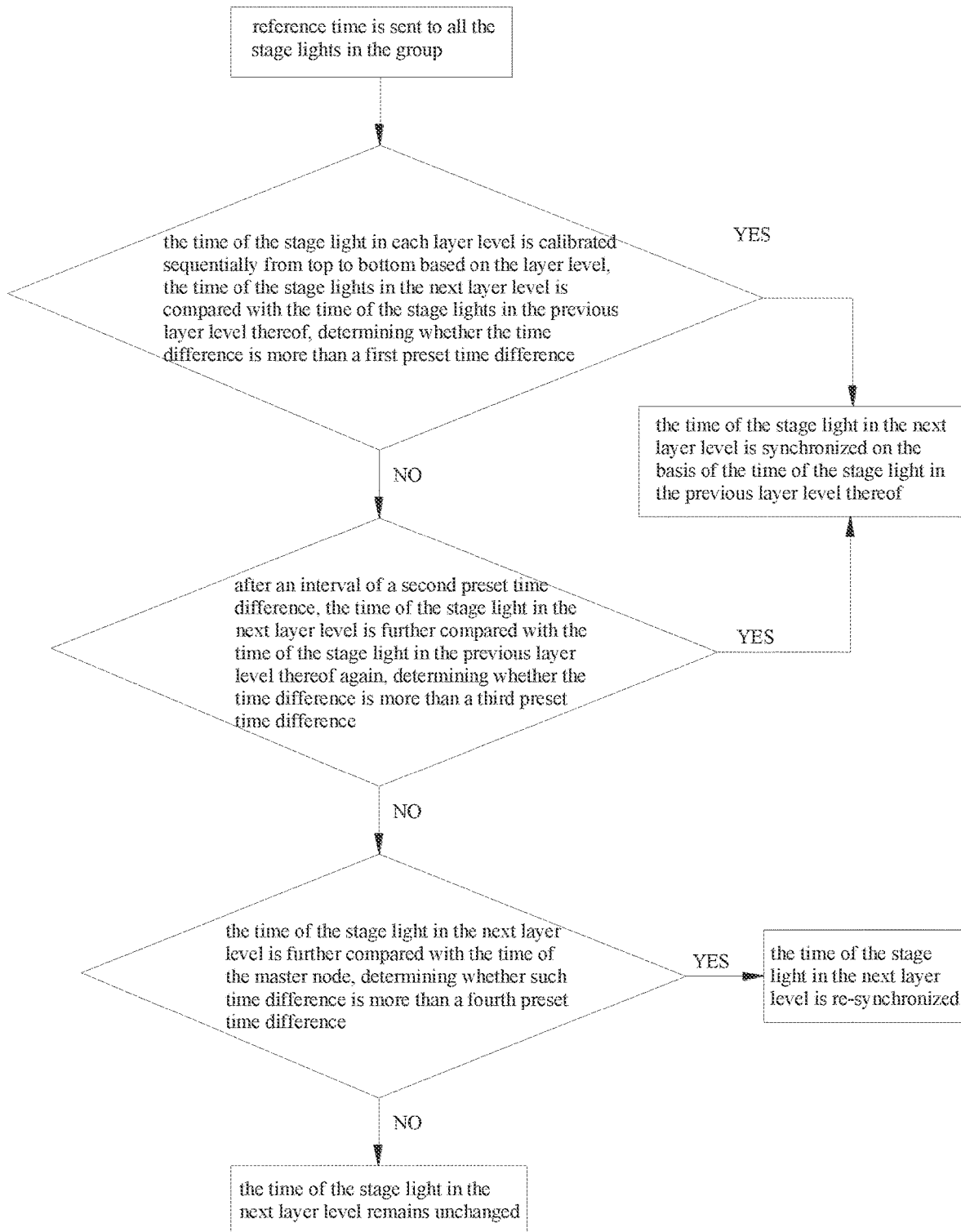
FIG. 3 is flowchart showing how to conduct accurate time synchronization among stage lights in a group according to an embodiment of the present invention.

FIG. 3 shows how to achieve time synchronization among the stage lights 200 within the group 330 according to a preferred embodiment of the present invention. Specifically, after all the stage lights 200 within the group 330 have received the reference time, the time of the stage light 200 in each layer level is calibrated sequentially from the top to the bottom based on the layer level. The time of the stage light 200 in the next layer level is compared with the time of the stage light 200 in the previous layer level thereof, if the time difference is less than or equal to a first preset time difference, the time thereof remains unchanged, otherwise the time of the stage light 200 in the next layer level is synchronized on the basis of the time of the stage light 200 in the previous layer level thereof; after an interval of a second preset time difference, the time of the stage light 200 in the next layer level is compared with the time of the stage light 200 in the previous layer level thereof again, if the time difference is less than or equal to a third preset time difference, the time of the stage light in the next layer level continues to be compared with the time of the master node 310, if such time difference is less than or equal to a fourth preset time difference, the time thereof remains unchanged, otherwise the time of the stage light 200 in the next layer level is re-synchronized. In the present embodiment, time synchronization is corrected layer by layer, so that the packet loss and air delay error brought by broadcasting time synchronization of the master node 310 can be avoided. In addition, during time synchronization of the stage light 200 in the next layer level, three-party time synchronization correction are achieved between the stage light in the next layer level, the stage light in the previous layer level, and the master node 310, it thus can ensure the time synchronization performance of all the stage lights 200 within the group 330 to fall in the error range that demands, realizing accurate time synchronization. Re-synchronization of the time of the stage light 200 in the next layer level can refer to synchronization with the time of the stage light 200 in the previous layer level, or synchronization with the time of the master node 310.

Preferably, the above correction requires to be repeated until it is verified that the time of the stage light in the next layer level, the stage light in the previous layer level, and the master node 310 all fall within the error range for at least 3 consecutive times, then it is considered that accurate time synchronization is completed. In this embodiment, it is more preferably required that until it is verified that the time of the stage light in the next layer level, the stage light in the previous layer level and the master node 310 all fall within the allowable range for 5 consecutive times, then it is considered that accurate time synchronization is completed. Repeated correction can avoid inaccuracy result of single correction caused by accuracy error of the crystal oscillator of the stage light.

Preferably, the first preset time difference, the third preset time difference, and the fourth preset time difference are all 5 ms, and the second preset time difference is 10 s.

Referring to FIG. 4, in a preferred embodiment of the present invention, after the stage lights 200 within the group 330 complete time synchronization, the master node 310 will still continuously broadcast a time signal in real time, and each stage light 200 within the group 330 can compensate for the received time signal according to the delay time caused by layer level between each stage light and the master node 310 and compares the time therebetween, if the time difference is greater than a fifth preset time difference, then the result is fed back to the master node 310, otherwise continues next comparison. Monitoring in real time whether the time of the stage light itself is abnormal and feeding back the result can allow a user to decide whether to timely perform adjustment for time synchronization or to allow the stage light 200 to continue to display the show under consideration of the actual situation.

As known, the stage lights 200 generally relies on its own crystal oscillator to provide time indication during its operation, but the precision of the crystal oscillator of the stage lights 200 is usually limited, which may cause that the deviation between each other after a period of operation will obviously affect the synchronization of the show frame of different stage lights 200 (the crystal oscillator error is generally around 10 us to 1 ms, and the naked eye can be aware of out of synchronization in more than 20 ms). Therefore, the stage light 200 within the group 330 compensates for the received time signal and compares the time therebetween to monitor in real time whether the time thereof is abnormal. In this way, during show performance by the stage lights 200, the time of the stage lights 200 within the group 330 can be adjusted in real time to keep the time difference between the stage light and the master node 310 within the range of the fifth preset time difference, thereby facilitating automatically maintaining the show frame consistency between the stage light 200 within the group 330 and the master node 310.

Preferably, the above comparison step requires to be repeated until the time after being compensated for at least 2 consecutive times and the time of the stage light itself are both within the allowable range, then it is considered that the time of the stage light itself is not abnormal. In this embodiment, it is more preferably required that until the time after being compensated for at least 3 consecutive times and the time of the stage light itself are both within the allowable range, then it is considered that the time of the stage light itself is not abnormal. Therefore, single correction inaccuracy caused by the accuracy error of the crystal oscillator and the compensation error can be avoided.

The fifth preset time difference is preferably 10 ms.

Optionally, after receiving a feedback signal, the master node 310 can send out warning information and the time of the stage light 200 can also be automatically synchronized according to setting.

Referring back to FIG. 1 and FIG. 2, in a preferred embodiment of the present invention, the show data to be displayed by the stage lights 200 within the group 330 is forwarded by the controller 100 through the master node 310. In such way, interference to the stage lights 200 within the group 330 from the signal sent by the controller 100 can be avoided.

In a preferred embodiment of the present invention, show data of one show to be displayed by the stage lights 200 within the group 330 is sent by the controller 100 at one time. That is, the data of one show is sent at one time, and when there are multiple shows, the data of the multiple shows is sent several times, so that each stage light 200 can know in advance the corresponding show needing to be displayed by itself, and after the show of the stage light itself is completed to display, even if the time thereof starts to become abnormal, the time of such the stage light can be free of synchronization, even if other stage lights 200 are still displaying the show, thereby saving the computing power and simplifying the processing flow. However, the data of one show of a conventional console is sent step by step by the console during the show performance by the stage lights. In a preferred embodiment of the present invention, the stage lights 200 in the LAN 300 form a plurality of groups 330, and the plurality of groups are independent of each other. In such configuration, each group can display its own show independently, such LAN 300 thus can achieve more lighting effects.

An ID number is given to each group 330, and the ID number is bound to the SN number (Serial Number) of each stage light 200 within the group 330. The master node 310 can acquire the network MAC address of the stage light 200 through the ID number to send the signal.

Of course, it is also possible that all the stage lights 200 within the LAN 300 together form a group 330, i.e., there is only one group 330 in the LAN 300.

In a preferred embodiment of the present invention, the ad hoc network module 210 is a WIFI module or a Bluetooth module, which is a common ad hoc network module 210 having a stable performance and mature technology, and reduced connecting cables between the stage lights 200, so that it is more convenient to mount the stage light 200.

In a preferred embodiment of the present invention, the controller 100 is a cell phone, tablet personal computer or mobile computer wirelessly connected to the stage light 200. It is convenient to directly control the stage light 200 and reduces the connecting cables with the stage light 200, achieving more convenient to mount the stage light 200.

Preferably, each stage light 200 has a power storage module for it to display a show, so that no connecting cables are required between the stage light 200 and the controller 100, or between the stage lights 200. Therefore, it is more flexible to mount the stage light 200 and more convenient to use the stage light.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A Mesh network-based synchronization system of a stage light group, comprising
a plurality of stage lights, each of the stage lights having an ad hoc network module; and
a controller for controlling the plurality of stage lights, which is configured to control several stage lights to establish a local area network (LAN) based on Mesh technology under the help of the ad hoc network module, wherein one stage light in the LAN is taken as a master node, at least one tree-shaped network topological structure connected to the master node is formed by the remaining stage lights in the LAN, and some stage lights in the LAN are selected to form a group,
wherein it is configured that subsequent to time synchronization of the stage lights in the group, delay time of each stage light in the group relative to the master node is respectively calculated according to a layer level between the corresponding stage light in the group and the master node, and the master node is configured to send a start command in advance of the corresponding delay time to the respective stage light to synchronously display a show by the stage lights within the group.

2. The Mesh network-based synchronization system of a stage light group according to claim 1, wherein during displaying the show by the stage lights in the group, the master node is configured to delay sending the start command according to the maximum delay time among the stage lights in the group, and then based on such delay time to send the start command to the respective stage light in advance of the corresponding delay time of each stage light.

3. The Mesh network-based synchronization system of a stage light group according to claim 1, wherein once the stage lights in the group receive data of the show, the show is segmented according to time points to acquire a show frame of respective stage light at each time point of the show.

4. The Mesh network-based synchronization system of a stage light group according to claim 3, wherein in a case of power failure, the stage lights in the group are configured to have time synchronization and receive the data of the show again once restarted, meanwhile the show of the stage lights is segmented again and the stage light is adjusted to the corresponding show frame according to the time synchronized.

5. The Mesh network-based synchronization system of a stage light group according to claim 1, wherein in a case that stage lights in a certain layer level in the group are powered off, the stage lights in the next layer level thereof are connected to the other stage lights in the group.

6. The Mesh network-based synchronization system of a stage light group according to claim 1, wherein during time synchronization among the stage lights within the group, reference time received by the master node from the controller is sent step by step according to the layer level until all the stage lights within the group have received the reference time.

7. The Mesh network-based synchronization system of a stage light group according to claim 6, wherein the time synchronization among the stage lights within the group is conducted in a way that: after all the stage lights within the group have received the reference time, the time of the stage light in each layer level is calibrated sequentially from top to bottom based on the layer level, specifically the time of the stage lights in the next layer level is compared with the time of the stage lights in the previous layer level thereof, if the time difference is less than or equal to a first preset time difference, the time thereof remains unchanged, otherwise the time of the stage light in the next layer level is synchronized on the basis of the time of the stage light in the previous layer level thereof; after an interval of a second preset time difference, the time of the stage light in the next layer level is further compared with the time of the stage light in the previous layer level thereof again, if the time difference is less than or equal to a third preset time difference, the time of the stage light in the next layer level is further compared with the time of the master node, if such time difference is less than or equal to a fourth preset time difference, the time thereof remains unchanged, otherwise the time of the stage light in the next layer level is re-synchronized.

8. The Mesh network-based synchronization system of a stage light group according to claim 1, wherein after time synchronization among the stage lights within the group is completed, the master node is configured to still continuously broadcast a time signal in real time, and each stage light within the group is configured to compensate for the time signal received according to the delay time caused by the layer level between each stage light and the master node and compare the time therebetween, if the time difference is greater than a fifth preset time difference, then the result is fed back to the master node, otherwise next comparison is conducted.

9. The Mesh network-based synchronization system of a stage light group according to claim 1, wherein the data of the show to be displayed by the stage lights within the group is forwarded by the controller through the master node.

10. The Mesh network-based synchronization system of a stage light group according to claim 1, wherein the data of one show to be displayed by the stage lights within the group is sent by the controller at one time.

11. The Mesh network-based synchronization system of a stage light group according to claim 1, wherein the stage lights in the LAN are defined to form a plurality of groups which are independent of each other.

12. The Mesh network-based synchronization system of a stage light group according to claim 1, wherein the ad hoc network module is in a form of a WIFI module or a Bluetooth module.

13. The Mesh network-based synchronization system of a stage light group according to claim 1, wherein the controller is in form of a cell phone, a tablet personal computer, or a mobile computer wirelessly connected to the plurality of the stage lights.

* * * * *